July 14, 1925.                                                              1,545,969
E. NORDEN
DRAFT REGULATOR FOR BOILER FURNACES
Filed April 11, 1922                            2 Sheets-Sheet 1
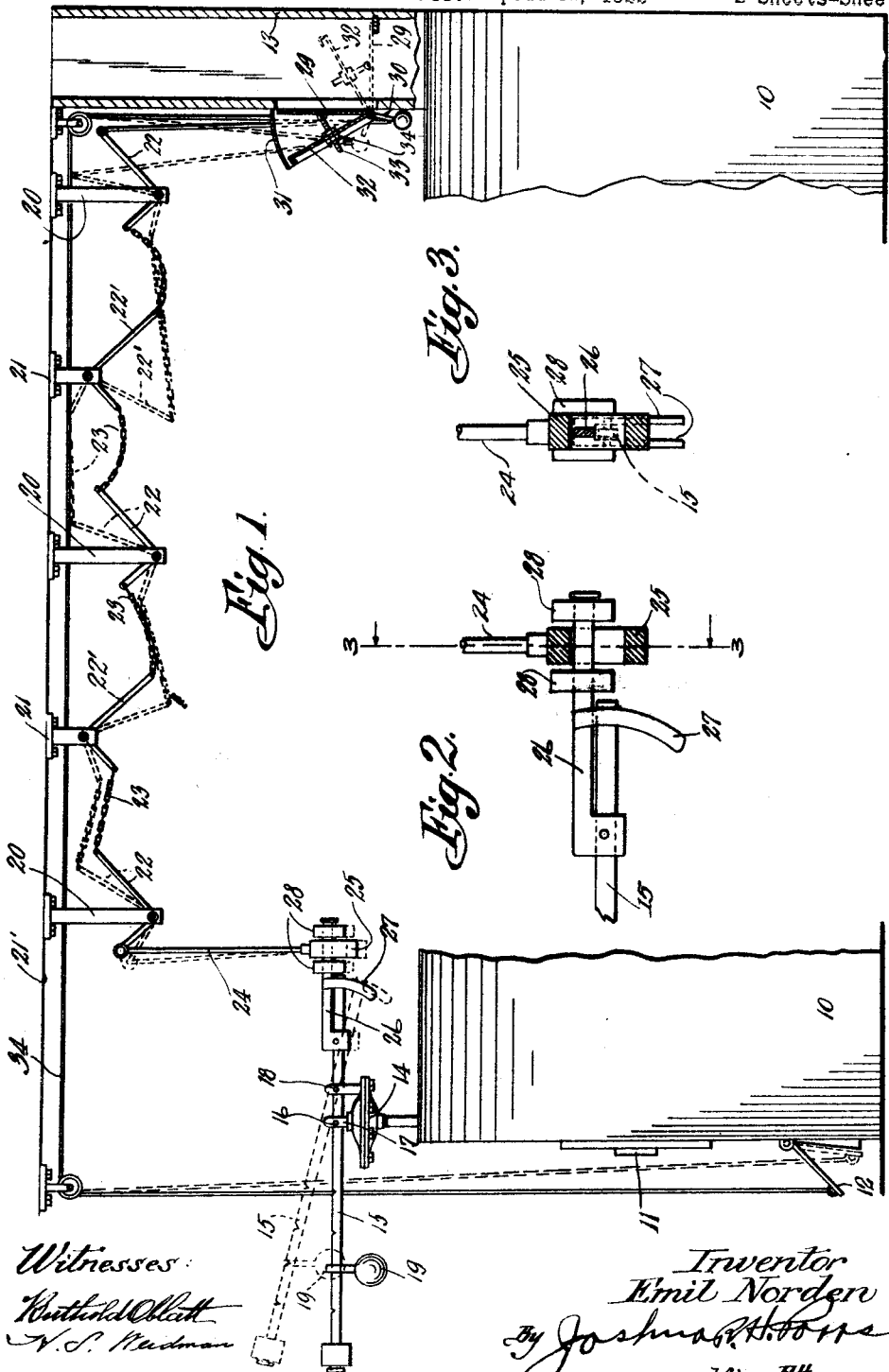

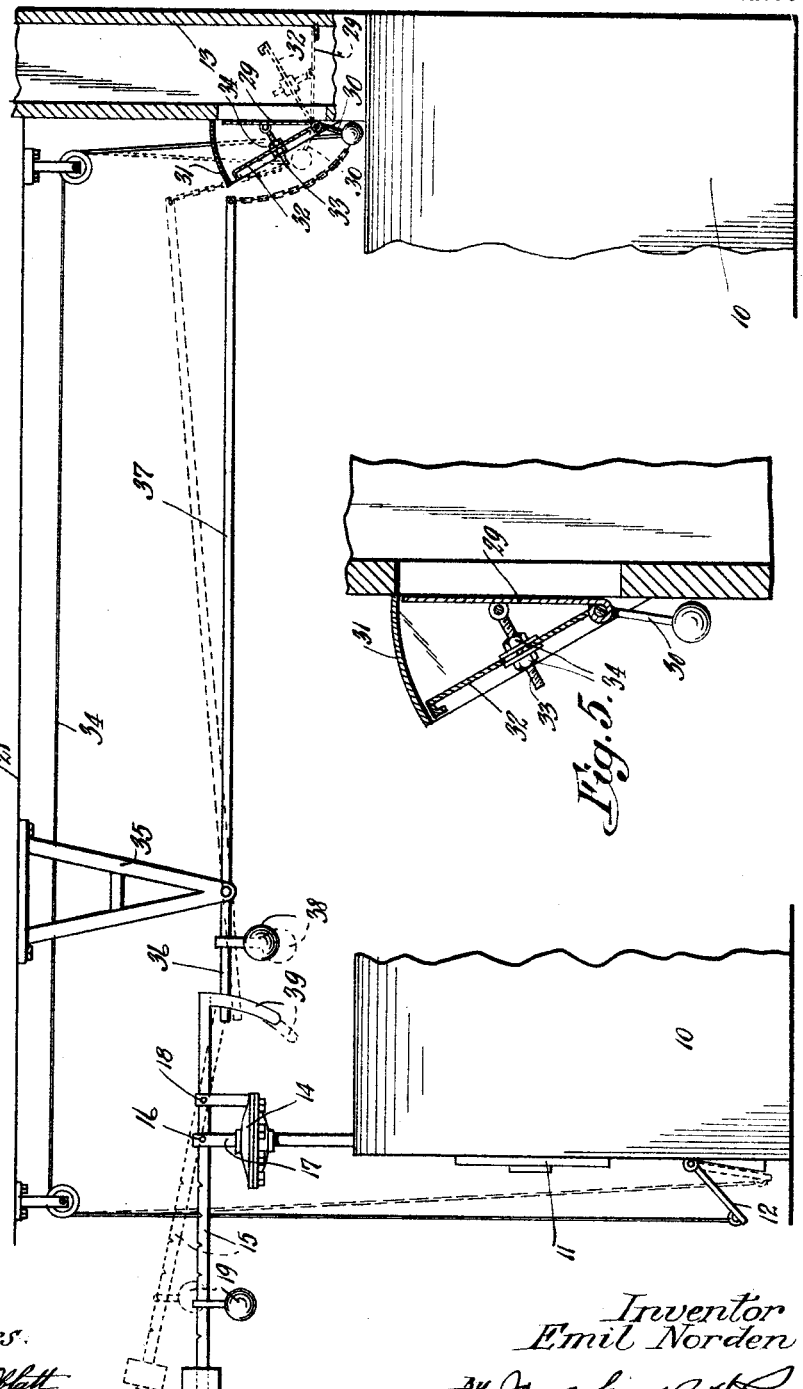

Patented July 14, 1925.

1,545,969

UNITED STATES PATENT OFFICE.

EMIL NORDEN, OF CHICAGO, ILLINOIS.

DRAFT REGULATOR FOR BOILER FURNACES.

Application filed April 11, 1922. Serial No. 551,669.

*To all whom it may concern:*

Be it known that I, EMIL NORDEN, a citizen of the United States, and a resident of the city of Chicago, county of Cook, and State of Illinois, have invented certain new and useful Improvements in Draft Regulators for Boiler Furnaces; and I do hereby declare the following to be a full, clear, and exact description thereof.

This invention relates to draft regulators for boiler furnaces, and has for its object the provision of means automatically operable by the pressure regulator of said furnace to regulate the draft therethrough.

Another object of the invention is to provide means for delaying the operation of the draft operating mechanism until the pressure, and consequently the pressure regulator, have reached a certain point before the draft operating mechanism is actuated.

Still another object is to provide means whereby the comparatively small movement of the pressure regulator is multiplied to impart to the draft operating mechanism a much greater movement.

Still another object of the invention is to balance the draft operating mechanism whereby only a comparatively small force is necessary to operate same.

Other objects will appear hereinafter.

The invention consists in the combinations and arrangements of parts hereinafter described and claimed.

The invention will be best understood by reference to the accompanying drawings forming a part of this specification, and in which, Fig. 1, is a fragmentary side elevational view of a boiler furnace showing the invention applied thereto.

Fig. 2, is a detail view of means actuated by the pressure regulator of the boiler to impart an operative stroke to the draft operating mechanism.

Fig. 3, is a view partly in section on the line 3—3, Fig. 2.

Fig. 4, is a view of a modified form of the apparatus for transmitting movement of the pressure regulator to the draft operating mechanism, and Fig. 5, is a detail view of the damper used in connection with the invention.

The invention comprises a furnace of any desirable type having a body portion 10, containing the boiler and means for heating same, such furnace being provided with a door 11 leading into the fire box, a draft door 12, and a flue or chimney 13, for the escape of products of combustion. A pressure diaphragm 14 or other suitable pressure regulator of any ordinary type may be mounted in the usual manner on the furnace, such regulator in this instance being provided with a lever 15 pivoted at 16 to the movable element 17 of the regulator 14, and also pivoted at 18 on a bracket mounted on the casing of such regulator. The lever 15 is also usually provided with an adjustable weight 19 to regulate the movement of said lever. The construction of the furnace so far described is well known and no claim is made herein to such construction except in conjunction with the apparatus hereinafter described.

In carrying out my invention, I provide means for multiplying a comparatively small movement of the lever 15 of the pressure regulator 14 so as to impart a greater movement to draft operating mechanism situated at some distance from said lever.

This may be accomplished in many different ways of which I disclose several herein. The preferred construction consists of suitable spaced brackets 20 and 21, which may be mounted on any suitable support, in this particular instance being secured to the ceiling 21' above the boiler furnace. Preferably pivotally mounted at the end of each of the brackets 20 is a bell-crank lever 22, one of the legs of which is preferably twice as long as its other leg, the shorter leg in this instance projecting on the outer side of its related bracket. Preferably pivotally connected to the end of each of the brackets 21 is a bell-crank lever 22' similar in all respects to the levers 22, excepting that same is inverted, thus providing alternating upright and inverted bell crank levers. The adjacent ends of such levers are preferably connected together by suitable flexible elements 23, as shown. By this arrangement, it is apparent that small movement communicated to the short leg of the outermost bell-crank lever will impart a much greater movement to the long leg of the innermost bell-crank lever.

Pivotally secured to the short leg of the outermost bell-crank lever 22 is a suitable link 24 which preferably carries at its end a suitable slotted bracket 25, of such weight as to normally hold the bell-crank levers and their connections under slight tension to prevent play therebetween. The bracket 25 is connected to the draft regulating lever 15 by means of a bar 26 pivotally connected to the lever 15, and having its inner end projecting through the slot in the bracket 25, in the normal position of the lever 15 being held thereby at the upper end of said slot, the object in having the lever 26 normally resting in the upper end of the slot in the bracket being for the purpose of permitting considerable movement of the lever 15 before imparting operative movement to the draft mechanism, in contradistinction to the type of draft regulating means which operates immediately the lever 15 begins to move to close the draft mechanism. Such bar is preferably provided with a forked guide member 27 adapted to engage the end of the lever 15 as shown, to prevent lateral movement of said bar with respect to said lever. A number of suitable weights 28 are preferably mounted upon the bar 26, one on each side of the bracket 25 as shown. The object in pivotally mounting the bar 26 and providing same with weights 28 is for the purpose of preventing injury to the draft regulator in the event that the mechanism for transmitting movement to the draft mechanism should fail to operate for any reason, it being apparent that when the bar 26 reaches the bottom of the slot in the bracket 25, and the resistance offered by said bracket is greater than the force exerted by the weights 28, continued movement of the lever 15 downwardly will cause the bar 26 to swing on its pivot without exerting injurious strain on the apparatus.

Mounted in the chimney 13 is a suitable damper 29, which is preferably normally held in inoperative position by means of a weighted arm 30, and a connection is made with the end of the innermost bell-crank lever 22 and the arm 30, movement of said connection through said bell-crank lever serving to swing the damper 29 to closed position. In the present instance, I preferably mount such a damper 29 in a housing 31, and I pivotally mount an auxiliary damper 32 on the damper 29, and preferably provide adjustable means for varying the distance between the dampers 29 and 32. Such adjustable means may consist of a finger 33 pivotally mounted on the damper 29 and extending through a slot in the damper 32, such finger being threaded, and there being lock nuts 34 provided as shown, turning of said nuts being adapted to slide the damper 32 on the finger 33 and so vary the distance between the dampers. By this arrangement, it will be seen that though the damper 29 may be turned into the chimney 13 to cut off the draft therethrough, so long as the auxiliary damper 32 remains in the housing 31 cold air will be excluded from the chimney, thus avoiding sudden and undesirable cooling of the furnace.

The draft door 12 is connected to the weighted arm 30, by a flexible connection 34, and of course movement of the arm 30 is transmitted through such connection to the draft door 12.

In Fig. 4 is shown a modification of the invention, which is similar in all respects to that above described except for the means for multiplying the movement of the lever 15, and the means for connecting such lever to the multiplying means. Instead of the bell-crank levers, a bracket 35 is secured to ceiling 21' above the furnace, and to the end of said bracket is pivoted a lever having a short end 36 and a long end 37, the end 37 of the lever being connected to the arm 30 above described. The longer end 37 of the lever is preferably balanced by weight 38 which holds the lever in the position shown in full lines in Fig. 4, which is slightly beneath the normal position of the lever 15. The lever 15 in this instance is preferably provided with a forked guide 39 at its end which is disposed about the end 36 of said lever. Retaining the lever somewhat below the normal position of the lever 15 accomplishes the same purpose as the slot and lever connection above described, namely, that the lever 15 is free to move a predetermined distance before imparting an operative stroke to the end 36 of the lever.

It will be seen that movement of the lever 15 to a certain point actuates multiplying mechanism which communicates a greater movement to the damper, which in turn communicates movement to the draft door.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination of a furnace having a movable regulator; draft mechanism having means for actuating same; and a bracket connected to said actuating means and having a slot therein, adapted to receive a part of said regulator therein which in normal position rests in the upper end of said slot, and the movement of said regulator part being transmitted only to said bracket when it reaches the lower end of said slot.

2. The combination of a furnace having a movable regulator; draft mechanism having means for actuating same; means for normally imparting an operative stroke of said regulator to said actuating means; and slot and lever means arranged to provide slack play when said actuating means offers greater than normal resistance to the movement of said regulator.

3. The combination of a furnace having a movable regulator; draft mechanism having means for actuating same; a lever pivotally connected to said regulator and connected to said actuating means; and weights on said lever adapted to overcome the normal resistance of said actuating means to operate same, but permitting said lever to swing on its pivot when said actuating means offers greater than said normal resistance.

4. The combination of a furnace having a movable regulator; draft mechanism; multiplying mechanism consisting of a series of pivoted alternate upright and inverted bell cranks having legs of different lengths connected together; and a heavy bracket pivotally connected to the outer of said bell cranks and connected to said regulator adapted to balance said draft mechanism so that a comparatively light stroke from said regulator will operate same.

5. The combination of a furnace having a movable regulator; draft mechanism; multiplying mechanism consisting of a series of pivoted alternate upright and inverted bell cranks having legs of different lengths connected together; and a bracket having a slot therein adapted to receive a part of said regulator, which in normal position rests in the upper end of said slot, and the movement of said regulator part being not transmitted to said bracket until it reaches the end of said slot.

6. The combination of a furnace having a movable regulator; draft mechanism; multiplying mechanism consisting of a series of pivoted alternate upright and inverted bell cranks having legs of different lengths connected together; a lever pivotally connected to said regulator and connected to said multiplying means; and weights on said lever adapted to overcome the normal resistance of said multiplying means to operate same, but permitting said lever to swing on its pivot when said multiplying means offers greater than said normal resistance.

7. The combination of a furnace having a movable regulator, and a flue at a distance therefrom; a housing communicating with said flue; radially disposed dampers pivotally mounted in said housing adapted to partially close said flue, at the same time excluding cold air therefrom; and multiplying means connecting said regulator and said dampers, said multiplying means consisting of a series of pivoted alternate upright and inverted bell cranks having legs of different lengths connected together.

8. The combination of a furnace having a movable regulator, and a flue at a distance therefrom; a housing communicating with said flue; and radially disposed dampers pivotally mounted in said housing adapted to partially close said flue, at the same time excluding cold air therefrom; multiplying mechanism operatively connected to said dampers, and consisting of a series of pivoted alternate upright and inverted bell cranks having legs of different lengths connected together; and a bracket connected to said multiplying mechanism, having a slot therein adapted to receive a part of said regulator therein, which in normal position rests in the upper end of said slot, and the movement of said regulator part being not transmitted to said bracket until it reaches the end of said slot.

In testimony whereof I have signed my name to this specification in the presence of two subscribing witnesses.

EMIL NORDEN.

Witnesses:
CLARENCE E. THREEDY,
JOSHUA R. H. POTTS.